United States Patent

[11] 3,586,864

| [72] | Inventors | Jaroslav Braný;<br>Jiří Panek; Stanislav Havel, all of Prague,<br>Czechoslovakia |
|---|---|---|
| [21] | Appl. No. | 773,900 |
| [22] | Filed | Nov. 6, 1968 |
| [45] | Patented | June 22, 1971 |
| [73] | Assignee | Vyzkumny ustav strojirenske technologie a ekonomiky<br>Prague, Czechoslovakia |

[54] APPARATUS AND METHOD FOR TESTING A BODY FOR SURFACE IRREGULARITIES
16 Claims, 8 Drawing Figs.

[52] U.S. Cl. .................................................... 250/219,
250/222, 356/237
[51] Int. Cl. .................................................... G01n 21/32
[50] Field of Search .......................................... 250/222,
221, 219 DF; 356/209—212, 118, 196, 204, 237

[56] References Cited
UNITED STATES PATENTS

| 2,701,055 | 2/1955 | Strom, Jr. ...................... | 356/196 X |
| 3,202,042 | 8/1965 | Jamieson et al. .............. | 356/212 |
| 3,331,963 | 7/1967 | Lippke ........................... | 250/219 |
| 3,340,400 | 9/1967 | Quittner ......................... | 250/219 |
| 3,430,055 | 2/1969 | Metzger ........................ | 250/219 |

Primary Examiner—Walter Stolwein
Attorney—Richard Low

ABSTRACT: A light beam is sequentially directed to each part of the surface of a light reflective body and the reflected light beam is converted into an electrical signal corresponding in magnitude to the intensity of the reflected light beam. The electrical signal is stored and the electrical signal and the stored signal are compared in magnitude. A difference in magnitude of the signals indicates an irregularity in the surface of the body.

PATENTED JUN22 1971 3,586,864

INVENTORS
Jaroslav Brany, Jiři Panek,
Stanislav Havel
By Richard Low ag't

APPARATUS AND METHOD FOR TESTING A BODY FOR SURFACE IRREGULARITIES

DESCRIPTION OF THE INVENTION

The present invention relates to the testing of a body for surface irregularities. More particularly, the invention relates to apparatus and a method for testing a light reflective body for surface irregularities. The tested body may comprise a body of any suitable regular geometric configuration having an endless surface such as, for example, a sphere or ball, or a limited surface such as, for example, a cylinder, a cone, a cube or other polyhedron.

In known apparatus, part of the surface of the tested body is scanned by a light beam. Part of the light beam reflected from the surface of the tested body is separated by a suitable mask or diaphragm and is transmitted to the cathode of a photosensitive cell. The photosensitive cell preferably provides a current having a magnitude proportional to the intensity of light impinging upon said cell. If there is a surface irregularity such as, for example, a rust spot, a crack, a depression or a protruding portion, the reflected light beam impinging upon the photosensitive cell is either diminished in intensity or is directed elsewhere, so that the magnitude of the current produced by said cell is decreased. The decrease of the current magnitude is utilized to eject or reject the tested body.

The aforedescribed system does not provide accurate or precise results, due to error caused by variations in intensity of the reflected light beam which result from variations in reflectivity of the surface of the body, by variations in the photosensitive cell, by variations in circuit components, and the like. If greater accuracy or precision are desired, an error compensating arrangement must be utilized. In a known error compensating system, two photosensitive cells are utilized and the reflected light beam impinges upon one of said cells, while the light beam impinging upon the second of the photosensitive cells is derived directly from the light source and is transmitted through an adjustable mask or diaphragm. The electrical signals produced by both photosensitive cells are compared by a differential amplifier which produces an output signal corresponding to the difference in magnitude of the signals supplied to it. The output signal of the differential amplifier is utilized to eject or reject the tested body.

Although the system utilizing two photosensitive cells provides more accurate or precise results than the system utilizing one photosensitive cell, it has a disadvantage due to the resolution or sensitivity being affected by the reflectivity of the surface of the tested body. The compensation arrangement fails to provide compensation when there are variations only in the circuit of one of the photosensitive cells. This results in errors of greater magnitude than those which occur in a system without a compensating arrangement. Variations in the circuit of one of the photosensitive cells may be caused by dust or other particles on optical components, foreign matter or internal deposit on lamps, variations in the characteristics of the photosensitive cell or variations in the reflectivity of the surface of the test body, for example.

The principal object of the present invention is to provide new and improved apparatus for testing a body for surface irregularities.

An object of the present invention is to provide a new and improved method for testing a body for surface irregularities.

An object of the present invention is to provide apparatus for testing a body for surface irregularities, which apparatus overcomes the disadvantages of known systems.

An object of the present invention is to provide apparatus for testing a body for surface irregularities, which apparatus is effective, efficient, precise, accurate and reliable in operation.

In accordance with the present invention, apparatus for testing a body having a light reflective surface for surface irregularities, comprises scanning means for sequentially directing a light beam to each part of the surface of a body having a light reflective surface and for converting the reflected light beam into an electrical signal corresponding in magnitude to the intensity of the reflected light beam. A signal storage connected to the scanning means stores the electrical signal provided by the scanning means. Signal comparing means having an input connected to the scanning means and another input connected to the signal storage compares the electrical signal provided by the scanning means and the electrical signal stored by the signal storage and provides an output signal corresponding to a difference in magnitude of the signal supplied thereto, a difference in magnitude of the signals indicating an irregularity in the surface of the body.

The signal storage stores either the average or maximum values of the electrical signal. The signal comparing means comprises a differential amplifier. An amplifier is connected between the scanning means and the signal storage and signal comparing means for amplifying the electrical signal provided by the scanning means. In a modification of the invention, a phase inverter is connected between the amplifier and the signal storage and the signal comparing means for amplifying and phase inverting the electrical signal provided by the scanning means.

The signal storage comprises a storage capacitor having a plate connected to the scanning means and a potentiometer connected in parallel with the storage capacitor. The potentiometer has a movable contact connected to the other input of the signal comparing means. In the modification, the signal storage comprises a storage capacitor having a plate connected to the phase inverter and a plurality of potentiometers connected in parallel with the storage capacitor. Each of the potentiometers has a movable contact. A switch means selectively connects the movable contact of each of the potentiometers to the other input of the signal comparing means.

Auxiliary charging means is connected to the plate of the storage capacitor of the storage for applying an auxiliary voltage to the storage capacitor. A diode is interposed in the connection between the scanning means and the one input of the signal comparing means and a diode is interposed in the connection between the scanning means and the plate of the storage capacitor.

In another embodiment of the invention, the signal storage comprises a first signal storage circuit having an input connected to the scanning means and an output and a second signal storage circuit having an input connected to the scanning means and an output of the first signal storage circuit. The signal comparing means comprises a first differential amplifier having a first input connected to the scanning means and a second input connected to the output of the first signal storage circuit and a second differential amplifier having a first input connected to the output of the first storage circuit and a second input connected to the output of the second storage circuit. The first signal storage circuit has a short time constant and the second signal storage circuit has a long time constant.

In accordance with the present invention, a method for enhancing accuracy in testing a body having a light reflective surface for surface irregularities comprises the steps of providing an instantaneous value of the reflectivity of a body having a light reflective surface, providing an average value of the reflectivity of the body, and comparing the instantaneous and average values of reflectivity to determine a difference between them.

In accordance with the present invention, a method for testing a body having a light reflective surface for surface irregularities, comprises the steps of sequentially directing a light beam to each part of the surface of a body having a light reflective surface and converting the reflected light beam into an electrical signal corresponding in magnitude to the intensity of the reflected light beam, storing the electrical signal, and comparing the electrical signal and the stored electrical signal and providing an output signal corresponding to a difference in magnitude of the signals, a difference in magnitude of the signals indicating an irregularity in the surface of the body. The average value of the electrical signal is stored, or the maximum value of the electrical signal is stored.

In order that the present invention may be readily carried into effect, it will now be described with reference to the accompanying drawings, wherein.

Figure 1:
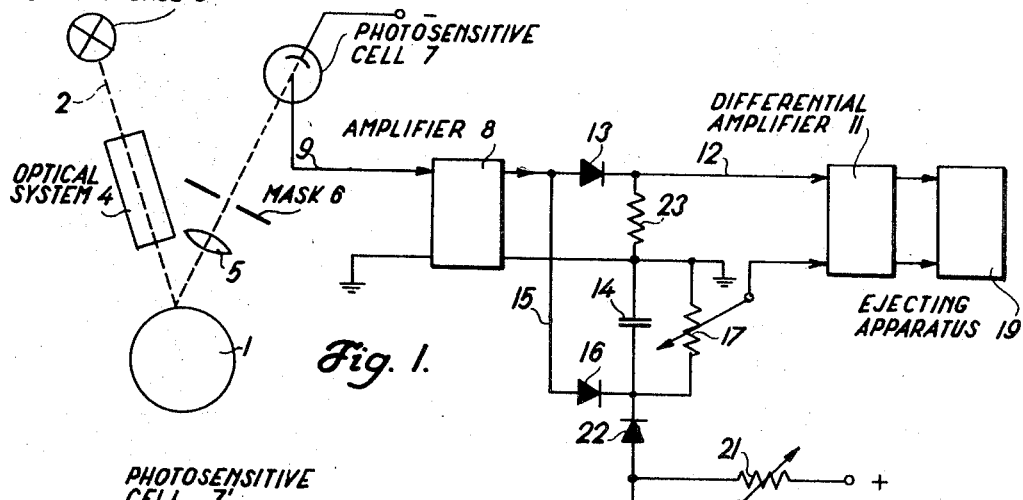
FIG. 1 is a schematic block and circuit diagram of an embodiment of the apparatus of the present invention for testing a body for surface irregularities.

In order to test a body having a light reflective surface for surface irregularities and to obtain an accurate or precise result, devoid of error caused by variable factors such as, for example, variations in surface reflectivity of the tested body, variations in the characteristics of the optical system and variations in the amplification factor of the amplifier, such factors must be eliminated. In accordance with the present invention, this is accomplished by determining the resolution or resolving power solely by the magnitude of the compensating voltage.

The compensating voltage is variable by a potentiometer. The surface of the test body is sequentially scanned by a light beam. Each part of the light reflective surface of the test body is scanned. The reflected light beam is converted into an electrical signal corresponding in magnitude to the intensity of said reflected light beam. The electrical signal is amplified and branched directly to one input of a differential amplifier and branched to a storage circuit. The storage circuit stores the average or maximum magnitude of the amplified electrical signal and such magnitude, which is the compensating voltage is applied to the other input of the differential amplifier. If the signals or voltages applied to both inputs of the differential amplifier are equal in magnitude, said differential amplifier produces no control signal and the test body is thereby indicated to be acceptable. If the signals applied to both inputs of the differential amplifier are not equal in magnitude, said differential amplifier produces a control signal which rejects or ejects the test body. If, however, the output voltages of the differential amplifier are equal in magnitude and at the very moment the ejecting apparatus fires, the test body is evaluated as a rejected one.

If the test body is to be rejected when the voltage $V1$ applied directly to the first input of the differential amplifier and the voltage $V2$ applied from the storage circuit to the second input of said differential amplifier are equal, then the voltage difference $\Delta V = V - V2 = 0$.

The following equation is then in effect $\Delta V = V1 - V2$ $\Delta A = (K1)S[a1(F1-F2)+(F2)a2] - (K2)S(F1)a1$   (1)

wherein $K1$ is the proportionality factor of the direct branch, $K2$ is the proportionality factor of the storage branch, $S$ is the luminous light flux of the light source, $a1$ is the coefficient of reflectivity of an acceptable surface, $a2$ is the coefficient of reflectivity of a defective or irregular surface, $F1$ is the tested area and $F2$ is the area of the defect or irregularity.

Since $K2/K1 = R1/R2$   (2)

$K2 = (K1 R1)/R2$   (3)

The coefficient of reflectivity $a2$ is zero for a black defect or irregularity, so the Equation (1), when incorporating $a2=0$ and Equation (3), becomes $\Delta V = (K1)S[a1(F1-F2)] - 0 - (K1R1/R2)S(F1)a1$ $\Delta A = (K1)S(a1)(F1-F2-(R1F1/R2)$   (4)

and, when $\Delta V$ equals zero, $F2 = F1 - (R1F1/R2)$ $\Delta A = F1(1 - R1/R2)$   (5)

wherein $R1$ is the resistance between the movable contact of the potentiometer and ground and $R2$ is the resistance between the lead to the potentiometer and ground or the total resistance of the potentiometer.

Equation (5) indicates that the defect area $F2$ which is preselected to be rejected is independent of the luminous light flux $S$ of the light source, of the coefficient of reflectivity $a1$ of an acceptable surface, of the proportionality factor $K1$ of the direct branch and of the proportionality factor $K2$ of the storage branch, and is dependent upon the magnitude of the tested area $F1$ and upon the rate between the resistance of the movable contact of the potentiometer $R1$ and the total resistance of the potentiometer $R2$. As the magnitude of the tested area $F1$, as well as the total resistance $R2$ of the potentiometer are constants, the defect area $F2$ preselected to be rejected is dependent solely upon the position of the movable contact of the potentiometer.

The embodiment of FIG. 1 is especially suitable for testing bodies having endless light reflective surfaces such as, for example, balls or spheres. In FIG. 1, a test body 1, having a light reflective surface such as, for example, a ball, is supported by any suitable arrangement which enables each part of its surface to be directly impinged by a light beam 2 from a light source 3. A suitable support arrangement may comprise, for example, that disclosed in copending U.S. Pat. application Ser. No. 499,802, filed Oct. 21, 1965 by Jaroslav Brany, now U.S. Pat. No. 3,398,592, and assigned to the assignee of the present invention.

The aforedescribed pending patent application discloses support apparatus in which the test ball is engaged at least at four surface points by holding elements which include a driving roller and a control roller. The annular contact face of the control roller about its axis of rotation is shaped so that the point of contact between the ball and roller is shifted back and forth in a circular arc in a plane defined by the roller axis and the ball center whereby all the parts of the surface of the ball pass an inspection area when the ball is moved by the driving roller.

The light beam 2 from the light source 3 passes through an optical system 4 which concentrates and focuses it before it impinges upon the test body 1. The light reflected from the test body 1 passes through an optical focusing and concentrating system 5 and a mask or diaphragm 6 before it impinges upon a photosensitive cell 7.

The photosensitive cell 7 produces an electrical signal, current or voltage which has a magnitude proportional to the intensity of the light impinging upon said photosensitive cell. The anode of the photosensitive cell 7 is connected to the input of an amplifier 8 via a lead 9. The amplifier 8 amplifies the electrical signal produced by the photosensitive cell 7 and supplies the amplified signal directly to a first input of a differential amplifier 11 via a lead 12 and a diode 13 connected therein. The lead 12 and diode 13 comprise the direct branch to the differential amplifier 11.

The amplified signal is also supplied to a storage branch or storage circuit including a storage capacitor 14 via the lead 12, a lead 15 and a diode 16 connected in the lead 15. A potentiometer or variable resistor 17 is connected in parallel with the storage capacitor 14 and the movable contact of said potentiometer is connected to a second input of the differential amplifier 11 via a lead 18. The output of the differential amplifier 11 is connected to suitable rejecting or ejecting apparatus 19 for ejecting the test body 1.

An auxiliary voltage is applied to the positive plate of the capacitor 14, to which the diode 16 is connected, via a variable resistor 21 and a diode 22. A resistor 23 is connected in series circuit arrangement with the capacitor 14 and connects the negative plate of said capacitor to the lead 12.

The mask or diaphragm 6 concentrates or limits the cross-sectional area of the beam of light reflected from the surface of the test body 1. The amplified electrical signal provided by the amplifier 8 is divided into the direct branch 12, 13 and the storage branch 14, 15, 16, 17. The electrical signal in the storage branch charges the capacitor 14 via the diode 16. The potential of the capacitor 14 is maintained at a magnitude which corresponds to the average or maximum magnitude of the amplified electrical signal.

Capacitor 14 follows the average or maximum value of output signal of amplifier 8 in dependence upon output resistance of the amplifier 8 which may be caused to vary by well-known techniques in the range of $\Omega$ to $M\Omega$. If an emitter follower is used as an output stage of the amplifier 8, the output resistance will be low. The charging time constant of the storage circuit $\tau_N$, is then at least 10 times lower than the steepness of the slope of the leading edge of output pulses of amplifier 8, and the capacitor 14 will follow the maximum magnitude of voltage across these pulses. The time constant $\tau_N$ is given by the relation $$\tau_N = R_{out} \cdot C_{14}$$

where $R$ out is the output resistance of amplifier 8 and $C_{14}$ the capacity of capacitor 14.

If, on the other hand, the output resistance $R_{out}$ of the amplifier 8 is high, the time constant $\tau_N$ is greater than the steepness of the slope of the leading edge of pulses, and the capacitor 14 is then not able to be charged to the maximum magnitude of pulses and will be charged to the average value. The magnitude of the amplified electric signal depends upon and is determined by, the reflectivity of the surface of the test body 1, the light beam 2, the sensitivity of the photosensitive cell 7 and the amplification factor of the amplifier 8 over a period of time determined by the time constant of the storage circuit 14, 17.

The storage circuit 14, 17 thus provides a voltage which is either the average or maximum voltage produced by the photosensitive cell 7 and amplifier 8 over a period of time which is determined by the time constant of the storage circuit 14, 17. The voltage across the resistor 23 corresponds to the instantaneous magnitude of the electrical signal provided by the photosensitive cell 7, and therefore corresponds to the instantaneous intensity of the light beam impinging upon said photosensitive cell.

The differential amplifier 11 compares the instantaneous voltage across the resistor 23 with the average or maximum voltage across the movable contact of the potentiometer 17. When there is an irregularity or defect on or in the surface of the test body 1, the reflected light beam is decreased in intensity or is reduced to zero, so that the potential across the resistor 23 correspondingly decreases in magnitude. The potential of the storage capacitor 14, however, and therefore that at the movable contact of the potentiometer 17, remains unchanged if the time constant of the storage circuit 14, 17 is suitable. When the voltage, due to surface irregularity or defect of the test body 1 across the resistor 23, decreases to or under the voltage level preselected by the movable contact of the potentiometer 17, the output voltage of the differential amplifier equals zero or its polarity is opposite that which corresponds to the defectless surface, the test body will be evaluated as a rejected one by the ejecting apparatus.

When the surface of the test body 1 is free from irregularity or defect, the reflected light beam is at its average or maximum intensity, so that the potential across the resistor 23 is equal in magnitude to that across the potentiometer 17. The whole voltage across the resistance 23 is supplied to one input of the differential amplifier 11, while the second input of the amplifier 11 is supplied by the voltage across the movable contact of the potentiometer 17, which is a preselected part of the whole voltage across the potentiometer 17 and determines the resolving power of the complete apparatus. The output voltage of the differential amplifier 11 has the polarity keeping the ejecting apparatus in position for ejecting the test body 1. As the test body 1 is appreciated as a rejected one, when the instantaneous voltage across the resistor 23 decreases due to surface irregularity or defect or the magnitude of the voltage of the movable contact of the potentiometer 17 and at such instant the input and output voltage of the differential amplifier equals zero, variations in the output voltage of the amplifier 8, which are longer in duration than the time constant of the storage circuit during charging and discharging of the storage capacitor 14, produce corresponding variations in the voltage across the resistor 23 and said storage capacitor, so that the resolving power, sensitivity, accuracy or precision of the complete apparatus remains unchanged.

Thus, as hereinbefore described, the voltage across the resistor 23 corresponds to the instantaneous signal of the photosensitive cell 7, or to the quality of the surface of the test body 1. The voltage across the potentiometer 17 corresponds either to the maximum or average value of the instantaneous signal of the photosensitive cell, so that maximum or average values are provided by the time constant determined by the total resistance of the potentiometer 17 and the capacity of the capacitor 14.

The movable contact of the potentiometer 17 and the desired resolving power of the apparatus predetermine a specific part of the total voltage across said potentiometer and said movable contact supplies one of the inputs of the differential amplifier 11. The other input of the differential amplifier is supplied by the voltage across the resistor 23 and said voltage is greater in magnitude than the voltage at the movable contact of the potentiometer 17, so that the differential amplifier 11 is unbalanced and maintains the ejecting apparatus 19 in its condition in which it accepts the test bodies 1.

When there is an irregularity in the surface of the test body 1 and the light beam 2 illuminates such irregularity, the magnitude of the signal produced by the photosensitive cell 7 decreases and appears as an abrupt voltage drop across the resistor 23. The voltage across the potentiometer 17, and therefore across the movable contact of said potentiometer remains unchanged. If the aforementioned voltage drop is so great that the instantaneous voltage across the resistor 23 is equal to or less than that across the movable contact of the potentiometer 17, the inputs and the outputs of the differential amplifier 11 are in balance or vary the voltage polarity.

At the instant that the outputs of the differential amplifier 11 are balanced, the ejecting apparatus 19 is actuated by said differential amplifier and ejects or rejects the test body 1. Since the ejecting apparatus 19 operates to eject the test body 1 at the instant of balance of the differential amplifier 11, the resolving power of the apparatus is independent of the total voltage of the amplifier 8 and depends only upon the position of the movable contact of the potentiometer.

Figure 2:
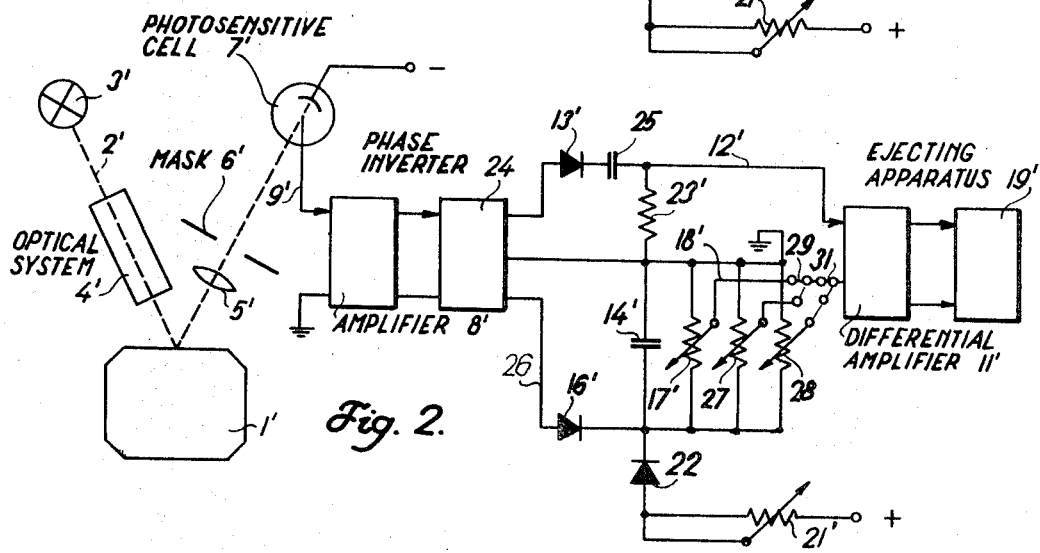
FIG. 2 is a schematic block and circuit diagram of a modification of the embodiment of FIG. 1.

The modification of FIG. 2 is especially suitable for testing bodies having limited light reflective surfaces such as, for example, a cylinder, cone or polyhedron. The components of FIG. 2 which are identified by primed numbers are identical with the corresponding components of FIG. 1. The modification of FIG. 2 comprises a phase inverter 24 connected to the output of the amplifier 8'. The amplifier 8' supplies the amplified signal directly to the first input of the differential amplifier 11' via the lead 12' and the diode 13' and a capacitor 25 connected in series therein. The lead 12', diode 13' and capacitor 25 comprise the direct branch to the differential amplifier 11'.

The amplified signal in FIG. 2 is also supplied to the storage branch via a lead 26 and the diode 16' connected therein. The potentiometer 17' and additional potentiometers 27 and 28 are connected in parallel with the storage capacitor 14'. The movable contact of the potentiometer 17' is connected to the second input of the differential amplifier 11' via a pair of switches 29 and 31 connected in series in the lead 18', when both said switches are in their solid line positions. The movable contact of the potentiometer 27 is connected to the second input of the differential amplifier 11' via the switches 29 and 31 when the switch 29 is in its broken line position and the switch 31 is in its solid line position. The movable contact of the potentiometer 28 is connected to the second input of the differential amplifier 11' via the switch 31 when said switch is in its broken line position.

The switches 29 and 31 of FIG. 2 are selectively positioned either manually or automatically such as, for example, by relay or cam, to provide a desired level of resolving power or resolution. Thus, during the testing of a cylindrical body, for example, the circular base areas are tested at one resolution and the lateral cylindrical area is tested at another resolution. The different resolutions are determined by positioning the switches 29 and 31.

The capacitor 25 functions as a filter to filter out variations in the amplified electrical signal due to rearrangement of the test body 1' in position. The limited surfaces of the test body 1' are tested individually, at the desired resolutions. The effect of any variations of surface reflectivity of the test body 1', of the characteristics of the phase inverter 24 is eliminated in the circuit of FIG. 2.

Figure 3:
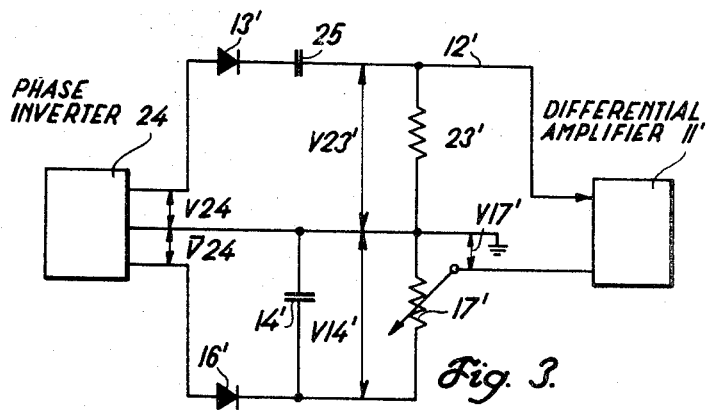
FIG. 3 is a schematic block and circuit diagram of part of FIG. 1, showing various voltages appearing therein.
Figure 4A:
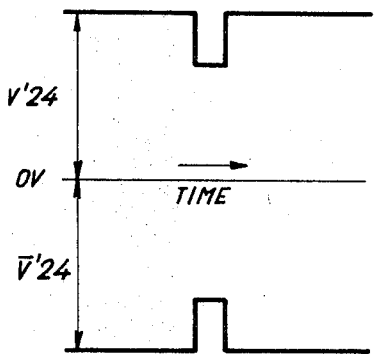
FIGS. 4A, 4B, 4C and 4D are graphical presentations of the voltage waveforms appearing in FIG. 3.
Figure 4C:
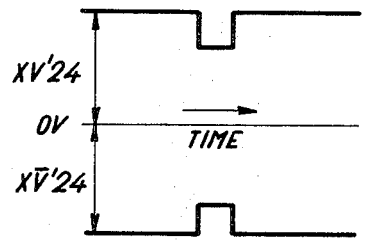
Figure 4B:
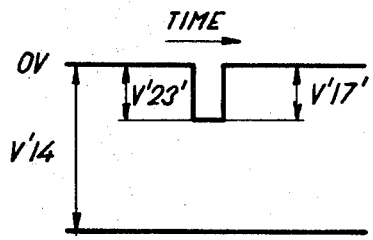
Figure 4D:
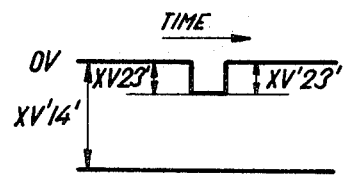

FIGS. 4A and 4B illustrate voltage waveforms for various parts of the circuit of FIG. 3, as labeled; the circuit of FIG. 3 being the storage branch or circuit of FIG. 2. The voltages of FIGS. 4A and 4B indicate the limiting error for normal surface reflectivity of the test body 1' (FIG. 2), and for normal photosensitive cell characteristics, respectively. FIG. 4C represents the limiting error for normal surface reflectivity of the test body, if such reflectivity is multiplied X times. FIG. 4D represents the limiting error for normal photosensitive cell characteristics, if such characteristics are multiplied X times.

In each of FIGS. 4A, 4B, 4C and 4D, the abscissa represents time and the ordinate represents voltage. In each of FIGS. 4C and 4D, X has a value at least three times greater than the charging and discharging time of the storage capacitor 14'. Since all the voltages in FIGS. 4A to 4D are varied in the same manner, the resolution or resolving power of the apparatus remains constant.

In each of the circuits of FIGS. 1 and 2, the storage capacitor 14 or 14' is charged by the voltage of a source of auxiliary voltage via the variable resistor 21 or 21' and the diode 22 or 22' in addition to the amplified voltage output of the amplifier 8 or 8'. This permits the testing of bodies having surface reflectivities which are beyond the range of reflectivities normally tested by the apparatus. The additional auxiliary charging voltage provides a minimum surface reflectivity value which is low enough to permit the accurate testing of test bodies having surface reflectivities which are less than the normal minimum reflectivity value.

If the acceptable range of reflectivity variation is $XV'$, and the variations in signal magnitude due to variations in the characteristics of the photosensitive cell 7 or 7', variations in intensity or angle of reflection of the light beam 2 or 2', variations in the characteristics of the optical systems 4 and 5 or 4' and 5' and variations in the amplification factor of the amplifier 8 or 8' are $YV'$, if $V'$ is the voltage corresponding to the maximum surface reflectivity (100 percent) of a normal test body and if the coefficients X and Y represent corresponding variations in the surface reflectivity and in the photoelectric system including the amplifier 8 or 8', then it is sufficient to compensate for variations in reflectivity only in the range $X(X+Y)$ and the voltage $V'(1-X-Y)$ may be permanently applied to the storage capacitor 14 or 14'.

Test bodies having decreased surface reflectivity are rejected if such reflectivity decreases from the normal reflectivity of V' equal to 100 percent by Z percent, wherein $$Z \text{ percent} = (X+Y)(1-Z1)+Z1$$

Z1 being the magnitude of the error set in the potentiometer 17 or 17'.

If, for example, the test body has a surface irregularity or defect which decreases the intensity of the reflected light beam 10 percent, so that $a1$ equals 0.1, and said test body is rejected at $X+Y=0.12$, each test body whose surface reflectivity decreases by 28 percent is rejected.

Figure 5:
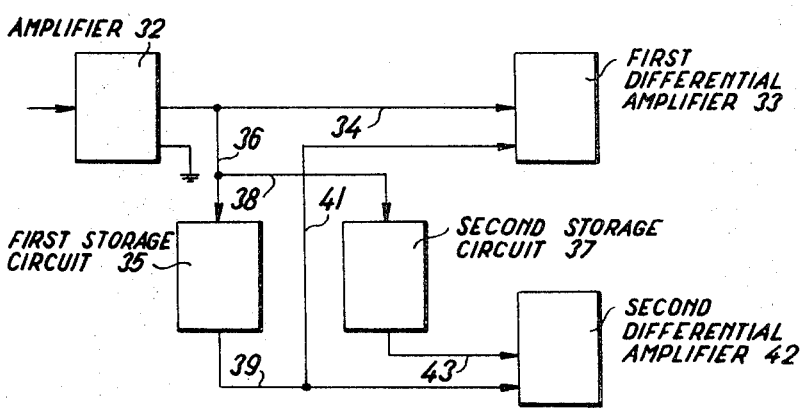
FIG. 5 is a block diagram of another embodiment of the apparatus of the present invention for testing a body for surface irregularities.

The embodiment of FIG. 5 is especially suitable for testing bodies having decreased surface reflectivities. The embodiment of FIG. 5 utilizes two storage circuits and therefore has greater sensitivity for such bodies. In FIG. 5, the output of an amplifier 32, which is the same as the amplifier 8 of FIG. 1 or the amplifier 8' of FIG. 2, is directly connected to the first input of a first differential amplifier 33 via a lead 34. The output of the amplifier 32 is also connected to the input of a first storage circuit 35 via the lead 34 and a lead 36, and to the input of a second storage circuit 37 via the leads 34 and 36 and a lead 38.

The output of the first storage circuit 35 is connected to the second input of the first differential amplifier 33 via leads 39 and 41, and to the first input of a second differential amplifier 42 via the lead 39. The output of the second storage circuit 37 is connected to the second input of the second differential amplifier 42.

The embodiment of FIG. 5, which tests bodies having decreased surface reflectivity and which compensates for such decreased reflectivity, functions by comparing the surface reflectivity of each test body (not shown in FIG. 5) with the maximum value of surface reflectivity during a selected specific period of time. The amplified electrical signal from the amplifier 32, which includes a representation of a surface irregularity or defect of the test body 1 or 1' (FIG. 1 or FIG. 2), is supplied to both the first and second storage circuits 35 and 37, and to the first input of the first differential amplifier 33, as hereinbefore described.

The first and second storage circuits 35 and 37 have different time constants. The first storage circuit 35 has a short time constant, which is approximately equal to or less than the time required for testing a body, so that said time constant is instantaneous. The first storage circuit 35 stores the average value of the surface reflectivity of the test body and such data is supplied to each of the first and second differential amplifiers 33 and 42.

The first differential amplifier 33 compares the signal from the amplifier 32 with the signal from the first storage circuit 35, so that said differential amplifier compares the average or mean value of the surface reflectivity of the test body, or of that part of the test body being tested, with the instantaneous value of such surface reflectivity. The first storage circuit 35 may store the maximum value of the surface reflectivity of the test body, instead of the mean or average value.

The second storage circuit 37 has a long time constant, which is greater than the time required for testing a body. The second storage circuit 37 stores the value of the surface reflectivity of the next preceding test body or the value of a preceding test body having a maximum surface reflectivity. The second differential amplifier 42 compares the signal from the first storage circuit 35 with the signal from the second storage circuit 37.

The second differential amplifier 42 compares the surface reflectivity of the test body with the maximum surface reflectivity of a previously tested body. The embodiment of FIG. 5, thus eliminates the influence of factors such as variations in surface reflectivity of the test bodies and variations of the amplification factor of the amplifier 8 or 8' on the accuracy of the test result.

While the invention has been described by means of specific examples and in specific embodiments, we do not wish to be limited thereto, for obvious modifications will occur to those skilled in the art without departing from the spirit and scope of the invention.

What we claim is:

1. Apparatus for testing a rotating body having a light reflective surface for surface irregularities, comprising:
    scanning means comprising means for sequentially directing a light beam to the surface of said body for producing a beam of reflected light corresponding thereto and means for converting said reflected light beam into an electrical signal corresponding in magnitude to the intensity of said reflected light beam and means for dividing said signal into first and second electrical signals;
    signal storage means connected to said scanning means for storing said first electrical signal provided by said scanning means; and
    signal comparing means having an input connected to said second electrical signal from said scanning means and another input connected to said signal storage means for comparing said second electrical signal provided by said scanning means and said first electrical signal stored by said signal storage means and providing an output signal corresponding to a difference in magnitude of the said first and second signals supplied thereto, a difference in magnitude of said first and second signals indicating an irregularity in the surface of said body.

2. Apparatus for testing a rotating body having a light reflective surface for surface irregularities, comprising:

scanning means for sequentially directing a light beam to the surface of a body having a light reflective surface and for converting the reflected light beam into an electrical signal corresponding in magnitude to the intensity of said reflected light beam;

signal storage means connected to said scanning means for storing one of the average and maximum values of said electrical signal provided by said scanning means; and signal comparing means having an input connected to said scanning means and another input connected to said signal storage means for comparing the electrical signal provided by said scanning means and the electrical signal stored by said signal storage means and providing an output signal corresponding to a difference in magnitude of the signals supplied thereto, a difference in magnitude of said signals indicating an irregularity in the surface of said body.

3. Apparatus as claimed in claim 2, wherein said signal comparing means comprises a differential amplifier.

4. Apparatus as claimed in claim 2, further comprising an amplifier connected between said scanning means and said signal storage means and said signal comparing means for amplifying the electrical signal provided by said scanning means.

5. Apparatus as claimed in claim 2, further comprising an amplifier connected to said scanning means and a phase inverter connected between said amplifier and said signal storage means and said signal comparing means for amplifying and phase inverting the electrical signal provided by said scanning means.

6. Apparatus as claimed in claim 2, wherein said signal storage means comprises a first signal storage circuit having an input connected to said scanning means and an output and a second signal storage circuit having an input connected to said scanning means and an output, and wherein said signal comparing means comprises a first differential amplifier having a first input connected to said scanning means and a second input connected to the output of said first signal storage circuit and a second differential amplifier having a first input connected to the output of said first storage circuit and a second input connected to the output of said second storage circuit.

7. Apparatus as claimed in claim 2, wherein said signal storage means comprises a storage capacitor having a plate connected to said scanning means and a potentiometer connected in parallel with said storage capacitor, said potentiometer having a movable contact connected to said other input of said signal comparing means.

8. Apparatus as claimed in claim 5, wherein said signal storage means comprises a storage capacitor having a plate connected to said phase inverter and a plurality of potentiometers connected in parallel with said storage capacitor, each of said potentiometers having a movable contact, and further comprising switch means for selectively connecting the movable contact of each of said potentiometers to said other input of said signal comparing means.

9. Apparatus as claimed in claim 6, wherein said first signal storage circuit has a short time constant and said second signal storage circuit has a long time constant.

10. Apparatus as claimed in claim 7, further comprising auxiliary charging means connected to said plate of the storage capacitor of said storage means for applying an auxiliary voltage to said storage capacitor.

11. Apparatus as claimed in claim 8, further comprising auxiliary charging means connected to said plate of the storage capacitor of said storage means for applying an auxiliary voltage to said storage capacitor.

12. Apparatus as claimed in claim 10, further comprising a diode interposed in the connection between said scanning means and said one input of said signal comparing means and a diode interposed in the connection between said scanning means and said plate of said storage capacitor.

13. Apparatus as claimed in claim 11, further comprising a diode interposed in the connection between said scanning means and said one input of said signal comparing means and a diode interposed in the connection between said scanning means and said plate of said storage capacitor.

14. A method for testing a body having a light reflective surface for surface irregularities, comprising the steps of:

sequentially directing a light beam to each part of the surface of a body having a light reflective surface and converting the reflected light beam into an electrical signal corresponding in magnitude to the intensity of the reflected light beam;

dividing said electrical signal to first and second signals;

storing said first signal; and subsequently comparing said second signal with said stored signal and providing an output signal correspond to a difference in magnitude of said first and second signals, a difference in magnitude of said first and second signals indicating an irregularity in the surface of said body.

15. A method as claimed in claim 14, wherein the average value of the electrical signal is stored.

16. A method as claimed in claim 14, wherein the maximum value of the electrical signal is stored.